June 7, 1966 A. NORWICH 3,255,411
SYSTEM AND METHOD FOR MEASURING A PROPERTY OF A DIELECTRIC
MATERIAL BY APPLYING SIGNALS AT TWO DIFFERENT FREQUENCIES
TO A CAPACITANCE PROBE AND MEASURING THE DIFFERENCE
IN OUTPUT SIGNALS WHILE MAINTAINING
ONE OUTPUT SIGNAL CONSTANT
Filed Feb. 21, 1962
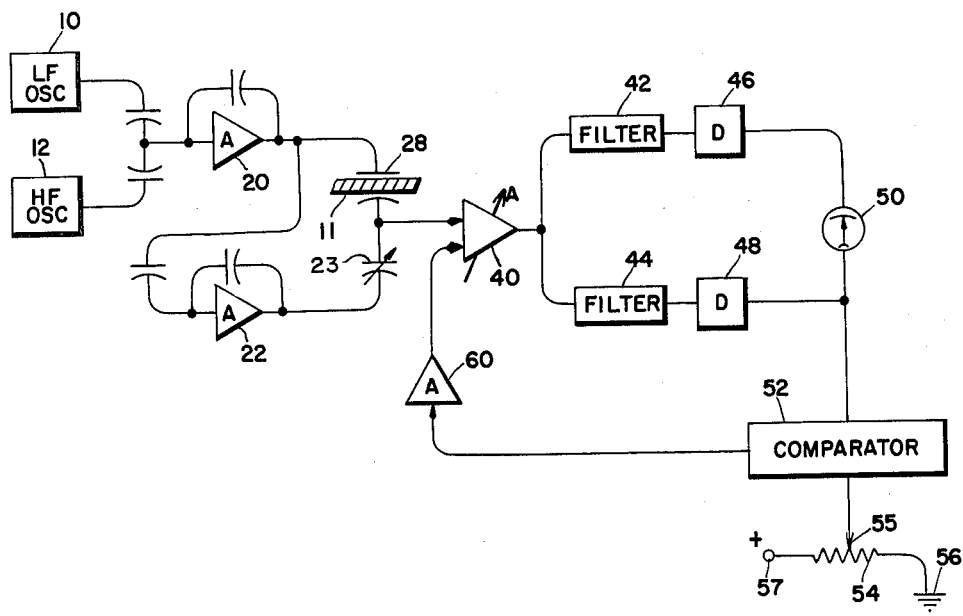
Inventor
Alan Norwich
By Anthony D. Cennamo
ATTORNEY

United States Patent Office 3,255,411
Patented June 7, 1966

3,255,411
SYSTEM AND METHOD FOR MEASURING A PROPERTY OF A DIELECTRIC MATERIAL BY APPLYING SIGNALS AT TWO DIFFERENT FREQUENCIES TO A CAPACITANCE PROBE AND MEASURING THE DIFFERENCE IN OUTPUT SIGNALS WHILE MAINTAINING ONE OUTPUT SIGNAL CONSTANT
Alan Norwich, Columbus, Ohio, assignor to Industrial Nucleonics Corporation, a corporation of Ohio
Filed Feb. 21, 1962, Ser. No. 174,747
9 Claims. (Cl. 324—61)

This invention relates generally to a measurement system having a plurality of signals at different frequencies applied to a capacitance probe, and specifically to a simplified signal comparison circuit for use in such a system.

The present invention is an improvement on the system described in U.S. Serial No. 41,975, for Measuring System by Albert F. G. Hanken and assigned to the same assignee, now Patent No. 3,155,900. In that system the capacitive probe forms part of a balanced bridge circuit. The capacitor includes as a dielectric the material to be measured in the industrial process. The bridge is simultaneously supplied with a pair of signals at separate frequencies, that is, the capacitive arms of the probe have applied at their terminals balanced voltages at widely displaced frequencies. There is produced across the bridge a pair of signals at the respective frequencies but at an amplitude varying in magnitude in accordance with the unbalance of the bridge at each frequency. The unbalanced signals are amplified in a wideband amplifier and then applied to a pair of filters. The first filter is adapted to select the signal at the first frequency and pass it to a detector. The output of the detector is a D.C. signal of a magnitude varying in accordance with the amplitude of the signal at the second frequency. The two signals at the output of the two detectors are then applied to a computer for indicating a response relating to a qualitative or quantitative constituent of the material in the capacitance probe.

In the Hanken application, supra, the computation of the high and low frequency signal is achieved by using a servo amplifier and servo driven potentiometer to provide the function of division. From a circuit and component standpoint this method is expensive and in certain industrial applications of the system may be prohibitive. Further in that system correction is necessary for detector linearity at low voltage levels; similarly the linearity of the amplifier is critical.

The system of the present invention is an improvement on the aforementioned Hanken application in that it provides a new and improved simplified computer for dividing the high and low frequency signals. The system of this invention is not however, dependent upon the linearity of the amplifiers or the detectors. In brief the high and low signals are amplified, separated and detected. The low frequency signal is then compared with a reference voltage and the difference is utilized to control the gain of the amplifier.

Accordingly it is a principal object of the present invention to provide a new and improved computation method and means in a multifrequency measuring system.

A further object of the present invention is to provide a computation system for a multifrequency measuring system that is independent of the linearity of the amplifiers and detectors.

Another object of the present invention is to provide a computation system for a multifrequency measuring system that eliminates mechanical and electromechanical components.

Still another object of the present invention is to provide a computation system for a multifrequency measuring system that is reliable but yet relatively inexpensive to manufacture.

Other objects and features of the present invention will become apparent from the following detailed description when taken in conjunction with the single figure drawing showing a preferred embodiment of the invention.

Referring now to the drawings, a pair of oscillator generators 10 and 12 are operative to produce a pair of test signals. These signals, at widely displaced frequencies and referred to hereinafter as the low and high frequency signals, are applied to the bridge driver amplifier 20. The amplifier 20 amplifies the signals to the desired amplitude and then feeds the signals into the phase inverting amplifier 22 to obtain exactly 180° phase reversed signals for the combined low and high frequency signals. The combined signals at the output of amplifier 20 are applied to a capacitance probe 28. The material 11 under measurement, as heretofore mentioned, forms a part of the dielectric of the capacitance 28. At the same time the amplifier 22 acts to apply signals 180° out of phase to the balancing capacitor 23 of the bridge, thus providing the balancing signal to balance the effect of the empty probe as is described in the aforesaid Hanken application. The amplifier 22 itself may be as described in greater detail in the copending application of Alan Norwich Serial No. 268,268, originally filed February 21, 1962 as Serial No. 174,748, now abandoned, for Measuring System.

As an illustration to the operation of the present invention moisture measurement is considered. As fully explained in the copending Hanken application, when the material 11 contains no moisture the high frequency signal will be of the same amplitude as the low frequency signal ($S_H = S_L$). If moisture would be introduced in the material 11 the low frequency signal will increase at a greater rate than the high frequency signal ($S_L > S_H$). However, if the basis weight were to be increased, both the high and the low frequency signals would increase, but the ratio of the one signal to the other would remain constant.

The high and low frequency signals $S_L$ and $S_H$ are fed to amplifier 40. This amplifier in the preferred form consists of a two stage amplifier using remote cut-off type of tubes. Each stage is designed to provide a 10:1 range of gain control and hence in cascade a control of 100:1 or better. The gain in each stage is varied by adjusting the bias on the control grids. The gain control of amplifier 40 is effectively the same at the two widely differing signal frequencies.

The high frequency signal after amplification is selected by the filter 42; and the low frequency signal after amplification is selected by the filter 44. These two filters 42 and 44 may be similar to those shown and described in the aforementioned Hanken application. The two separated signals at the low and high frequencies are then detected by the detectors 46 and 48 to provide corresponding D.C. signals, as described more fully in said Hanken application. That is, the high frequency signal is detected by detector 46 and the low frequency signal is detected by detector 48. The difference of these two signals is then read out on a meter, recorder, blind servo or other utilization means.

The low frequency signal $S_L$ is also fed to a comparator circuit 52 where it is compared with a reference voltage. This reference voltage may be a potentiometer 54 between a voltage source 57 and ground 56 with an adjustable tap 55. The difference between the low frequency signal and the reference voltage is amplified as a D.C. signal in the D.C. amplifier 60 and fed to the control grid of the amplifier 40.

As the moisture content of the material 11 under test increases the low frequency signal $S_L$ rises at a greater rate than the high frequency signal $S_H$. The increased low frequency signal $S_L$ compared with the reference voltage in the comparator 52 will result in a difference voltage at the output thereof. This D.C. error voltage is amplified in amplifier 60 and applied as a negative bias voltage to the amplifier 40. The bias in turn reduces the gain of the amplifier 40 to return the low frequency signal to the value of the set reference voltage.

An increase in basis weight will increase both the high and low frequency signals; and hence, there will be no change in the ratio of the two signals. The voltage at the high and low frequency detector 46 and 48 outputs will not change since the gain of the amplifier 40 will be reduced by the gain control feedback circuit. In this way the level at the low frequency detector is maintained constant with the reference voltage level. As both signals are carried by the same amplifier 40, the output of the high frequency detector will also remain constant in spite of an increase in basis weight.

As both $S_L$ and $S_H$ signals are common to the same amplifier, the output of the high frequency detector will be reduced by the amount of change in ratio of $S_L$ to $S_H$. The gain A of the amplifier will be equal to $1/S_L$ so that the output of the high frequency detector will be equal to $1/S_L \times S_H$ or $S \times S_H$. This effectively causes the $S_H$ output to be divided by the $S_L$ signal. For example, if the moisture content is increased so that the $S_L$ signal doubles in amplitude, then the gain of the amplifier 40 will be reduced to half the previous value. This in turn reduces the voltage gain available to the $S_H$ signal and thereby reduces the output at the $S_H$ detector in proportion to the increase in the $S_L$ signal. No moisture content corresponds to both signals being equal, and under this condition a meter connected between the detector will read zero. As the moisture content of the material 11 increases, the output of the low frequency detector will remain constant and the output of the high frequency detector will go down. The meter will then read the differential of these two outputs or the equivalent of $(S_L - S_H/S_L)$. An increase in basis weight, however, will not change the output voltage or output reading.

The signal levels at the detectors can be kept at relatively high levels, thus making it unnecessary to provide correction for the detector linearity at low voltage levels. Any inaccuracy due to this effect would show only at the high end of the moisture range when the $S_H$ signal is many times lower than the $S_L$ signal and would conceivably be beyond the required measuring range. In any case only the $S_H$ detector would need linearizing. The gain stability of the amplifier 40 does not have any effect upon accuracy of the computer; neither is the amplifier 40 required to have good linearity of gain versus the gain control voltage applied to it by the error signal. The D.C. amplifier 60 is also not critical as regards linearity or stability of gain or D.C. drift. The system is essentially a null seeking feedback device which strives to hold the output of the low frequency detector constant regardless of changes within the feedback loop in which the amplifiers are included. Below the reference voltage level setting of the $S_L$ detector, that is, below the level of minimum weight of material or moisture level to be measured, the computer will merely compute $S_L - S_H$. If desired, the gauge could be clamped below this level.

Although certain and specific embodiments have been described herein, modifications may be made thereto without departing from the true spirit and scope of the invention as set forth in the appended claims.

What is claimed is:

1. In a system for determining a property of a dielectric material, said system comprising signal generator means for generating input signals at high and low frequencies, detecting means, and a measuring probe coupled to said signal generator means and having spaced electrodes arranged for applying said input signals to at least a portion of said material and coupling said detecting means to said portion: the improvement wherein said detecting means includes means for deriving first modified signals resulting from the input signals applied to said portion as these applied signals are influenced by said material, means responsive to said first modified signals for deriving separate second and third modified signals corresponding to the components of said first modified signals at two respective frequencies, means responsive to one of said modified signals for maintaining its average amplitude substantially constant, and means for measuring the difference in amplitude of said second and third modified signals to provide an indication of said property independent of the mass of the material.

2. In a system for determining a property of a dielectric material, said system comprising two sources of electrical input signals at different respective frequencies, detecting means, and a measuring probe coupled to said sources and having spaced electrodes arranged for applying said input signals to at least a portion of said material and coupling said detecting means to said portion: the improvement wherein said detecting means includes means for deriving first modified signals resulting from the input signals applied to said portion as these applied signals are influenced by said material, means responsive to said first modified signals for deriving separate second and third modified signals each corresponding to the component of said first modified signals at a respective frequency, means responsive to one of said modified signals for controlling the amplitude of said first modified signals to maintain the average amplitude of said one of said modified signals substantially constant, and means for measuring the difference in amplitude of said second and third modified signals to provide an indication of said property independent of the mass of the material.

3. In a system for determining a property of a dielectric material, said system comprising two sources of electrical input signals at a high and a low frequency, respectively, detecting means, and a measuring probe coupled to said sources and having spaced electrodes arranged for applying said input signals to at least a portion of said material and coupling said detecting means to said portion; the improvement wherein said detecting means includes means for deriving first modified signals resulting from the input signals applied to said portion as these applied signals are influenced by said material, means responsive to said first modified signals for deriving separate second and third modified signals corresponding to the components of said first modified signals at said high and low frequencies, respectively, means responsive to one of said second and third modified signals for controlling the amplitude of said first modified signals to maintain the average amplitude of said one of said second and third modified signals substantially constant, and means for measuring the difference in amplitude of said second and third modified signals to provide an indication of said property independent of the mass of the material.

4. In a system for determining a property of a dielectric material, said system comprising two sources of electrical input signals at a high and a low frequency, respectively, detecting means, and a measuring probe coupled to said sources and having spaced electrodes arranged for applying said input signals to at least a portion of said material and coupling said detecting means to said portion: the improvement wherein said detecting means includes means for deriving first modified signals resulting from the input signals applied to said portion as these applied signals are influenced by said material, a variable gain amplifier for receiving said first modified signals and producing corresponding amplified modified signals, means responsive to said amplified modified signals for deriving separate second and third modified signals corresponding to the components of said amplified modified signals at said high and low frequencies, respectively, means responsive to said third modified signals for controlling the gain of said amplifier to maintain the average amplitude of said third modified signals substantially constant, and means for measuring the difference in amplitude of said separate second and third modified signals to provide an indication of said property independent of the mass of the material.

5. In a system for determining the relative moisture of a dielectric material, said system comprising two sources of electrical input signals at a high and a low frequency, respectively, detecting means, and a measuring probe coupled to said sources and having spaced electrodes arranged for applying said input signals to at least a portion of said material and coupling said detecting means to said portion: the improvement wherein said detecting means includes means for deriving modified signals resulting from the input signals applied to said portion as these applied signals are influenced by said material, a variable gain amplifier for receiving said modified signals and producing corresponding amplified modified signals, means responsive to said amplified modified signals for deriving first and second D.C. signals corresponding to the components of said amplified modified signals at said high and low frequencies, respectively, means responsive to said second D.C. signals for controlling the gain of said amplifier to maintain the average amplitude of said second D.C. signals substantially constant, and means for measuring the difference in amplitude of said first and second D.C. signals to provide an indication of said moisture independent of the mass of the material.

6. In a system for determining the relative moisture of a dielectric material, said system comprising two sources of electrical input signals at a high and a low frequency, respectively, detecting means, and a measuring probe coupled to said sources and having spaced electrodes arranged for applying said input signals to at least a portion of said material and coupling said detecting means to said portion: the improvement wherein said detecting means includes means for deriving first modified signals resulting from the input signals applied to said portion as these applied signals are influenced by said material, a variable gain amplifier for receiving said first modified signals and producing corresponding amplified modified signals, filter means responsive to said amplified modified signals for deriving separate second and third modified signals corresponding to the components of said amplified modified signals at said high and low frequencies, respectively, means responsive to said second and third modified signals for deriving first and second D.C. signals corresponding to respective second and third modified signals, means responsive to said second D.C. signals for controlling the gain of said amplifier to maintain the average amplitude of said second D.C. signals substantially constant, and means for measuring the difference in amplitude of said first and second D.C. signals to provide an indication of said moisture independent of the mass of the material.

7. A method for determining a property of a dielectric material, said method comprising applying electrical input signals at high and low frequencies to at least a portion of said material, deriving first modified signals resulting from the input signals applied to said portion as these applied signals are influenced by said material, deriving separate second and third modified signals corresponding to the components of said first modified signals at two respective frequencies, maintaining the average amplitude of only one of said modified signals substantially constant, and measuring the difference in amplitude of said second and third modified signals to provide an indication of said property independent of the mass of the material.

8. A method for determining a property of a dielectric material, said method comprising applying electrical input signals at each of two different frequencies to at least a portion of said material, deriving first modified signals resulting from the input signals applied to said portion as these applied signals are influenced by said material, deriving separate second and third modified signals each corresponding to the component of said first modified signals at a respective frequency, controlling the amplitude of said first modified signals to maintain the average amplitude of one of said modified signals substantially constant, and measuring the difference in amplitude of said second and third modified signals to provide an indication of said property independent of the mass of the material.

9. A method for determining a property of a dielectric material, said method comprising applying electrical input signals at each of two different frequencies to at least a portion of said material, deriving first modified signals resulting from the input signals applied to said portion as these applied signals are influenced by said material, deriving separate second and third modified signals corresponding to the components of said first modified signals at said high and low frequencies, respectively, controlling the amplitude of said first modified signals to maintain the average amplitude of said third modified signals substantially constant, and measuring the difference in amplitude of said second and third modified signals to provide an indication of said property independent of the mass of the material.

References Cited by the Examiner

UNITED STATES PATENTS

| | | | |
|---|---|---|---|
| 2,950,436 | 8/1960 | Butticaz et al. | 324—61 |
| 3,155,899 | 11/1964 | Davidson | 324—57 |
| 3,159,787 | 12/1964 | Sexton et al. | 324—99 |

FOREIGN PATENTS

| | | |
|---|---|---|
| 217,898 | 10/1958 | Australia. |
| 622,470 | 5/1949 | Great Britain. |

OTHER REFERENCES

"Wide Range Impedance Comparison Bridge," IBM Technical Disclosure Bulletin, article by W. G. Morton, vol. 4, No. 2, July 1961, p. 67.

WALTER L. CARLSON, *Primary Examiner.*

J. P. O'BRIEN, A. E. RICHMOND,
*Assistant Examiners.*

UNITED STATES PATENT OFFICE
CERTIFICATE OF CORRECTION

Patent No. 3,255,411                    Dated February 13, 1970

Inventor(s) Alan Norwich

It is certified that error appears in the above-identified patent and that said Letters Patent are hereby corrected as shown below:

Column 3, line 27, "SXS$_H$" should read ---AxS$_H$---;

Column 3, line 36, "detector" should read ---detectors---;

Column 3, line 41, "(S$_L$-S$_H$/S$_L$)" should read ---(S$_L$-S$_H$)/S$_L$---.

Column 4, line 43, "portion;" should read ---portion:---.

SIGNED AND
SEALED
JUN 23 1970

(SEAL)
Attest:

Edward M. Fletcher, Jr.
Attesting Officer

WILLIAM E. SCHUYLER, JR.
Commissioner of Patents